United States Patent
Huang et al.

(10) Patent No.: US 11,652,527 B2
(45) Date of Patent: May 16, 2023

(54) TECHNIQUES FOR PRIORITIZING CSI REPORTS

(71) Applicant: Qualcomm Incorporated, San Diego, CA (US)

(72) Inventors: Yi Huang, San Diego, CA (US); Wanshi Chen, San Diego, CA (US); Yu Zhang, Beijing (CN); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 16/973,305

(22) PCT Filed: Jun. 28, 2019

(86) PCT No.: PCT/CN2019/093522
§ 371 (c)(1),
(2) Date: Dec. 8, 2020

(87) PCT Pub. No.: WO2020/007238
PCT Pub. Date: Jan. 9, 2020

(65) Prior Publication Data
US 2021/0250073 A1 Aug. 12, 2021

(30) Foreign Application Priority Data
Jul. 2, 2018 (WO) ................ PCT/CN2018/093976

(51) Int. Cl.
*H04B 7/06* (2006.01)
*H04B 7/0456* (2017.01)
*H04L 1/00* (2006.01)

(52) U.S. Cl.
CPC ......... *H04B 7/0626* (2013.01); *H04B 7/0486* (2013.01); *H04B 7/063* (2013.01);
(Continued)

(58) Field of Classification Search
CPC .. H04B 7/0626; H04B 7/0486; H04B 7/0617; H04B 7/063; H04L 1/0003;
(Continued)

(56) References Cited

U.S. PATENT DOCUMENTS 9,755,706 B2 9/2017 Geirhofer et al.
2018/0331743 A1* 11/2018 Shen ............... H04B 7/0626
(Continued)

FOREIGN PATENT DOCUMENTS

CN 103107866 A 5/2013
CN 103181097 A 6/2013
(Continued)

OTHER PUBLICATIONS

R1-1806077, "Discussion on CSI report for URLLC," 3GPP TSG-RAN WG1 Meeting #93, Document Date: May 28, 2018 (Year: 2018).*
(Continued)

*Primary Examiner* — Charles C Jiang
*Assistant Examiner* — Biswajit Ghose
(74) *Attorney, Agent, or Firm* — Holland & Hart LLP

(57) ABSTRACT

Techniques are described herein for determining a priority ranking for channel state information (CSI) reports based at least in part on a reliability parameter, a latency parameter, or both of resources allocated to a user equipment (UE). In some wireless communications systems, ultra reliable low latency communication (URLLC) services may be interspersed with enhanced mobile broadband (eMBB) services. The UE may perform a CSI report prioritization procedure to account for reliability parameters, latency parameters or both. In some cases, CSI reporting for resources associated URLLC services may receive higher priority than CSI reporting for eMBB services. The UE may be configured to determine reliability parameters and/or latency parameters
(Continued)

based on signaling received from the network or from determining changes to one or more configurations of the UE. In some cases, the priority ranking of the CSI report may be based at least in part on a slot set identifier.

28 Claims, 11 Drawing Sheets

(52) U.S. Cl.
CPC ......... *H04B 7/0617* (2013.01); *H04L 1/0003* (2013.01); *H04L 1/0061* (2013.01)

(58) Field of Classification Search
CPC ... H04L 1/0061; H04L 1/0027; H04L 1/0009; H04L 1/0026; H04L 1/0018; H04W 72/1242; H04W 24/10
See application file for complete search history.

(56) References Cited

U.S. PATENT DOCUMENTS

| | | | | |
|---|---|---|---|---|
| 2019/0150176 | A1* | 5/2019 | Pelletier | H04W 72/0453 370/329 |
| 2019/0394758 | A1* | 12/2019 | Cheng | H04W 72/042 |
| 2020/0036473 | A1* | 1/2020 | Nemeth | H04L 5/0057 |
| 2020/0229104 | A1* | 7/2020 | MolavianJazi | H04W 72/1268 |
| 2020/0259625 | A1* | 8/2020 | Papasakellariou | H04B 7/0639 |
| 2020/0305147 | A1* | 9/2020 | Lee | H04L 1/1854 |
| 2020/0314900 | A1* | 10/2020 | Hosseini | H04W 74/0808 |
| 2020/0351129 | A1* | 11/2020 | Kwak | H04W 72/0493 |

FOREIGN PATENT DOCUMENTS

| | | |
|---|---|---|
| CN | 105991244 A | 10/2016 |
| CN | 106067845 A | 11/2016 |
| EP | 2597798 A2 | 5/2013 |
| WO | WO-2013192482 | 12/2013 |
| WO | WO-2019168738 A1 | 9/2019 |

OTHER PUBLICATIONS

International Search Report and Written Opinion—PCT/CN2018/093976—ISA/EPO—dated Apr. 8, 2019.
International Search Report and Written Opinion—PCT/CN2019/093522—ISA/EPO—dated Sep. 18, 2019.
Huawei., et al., "Remaining Aspects on Pre-Emption Indication for DL Multiplexing of URLLC and eMBB", 3GPP Draft, 3GPP TSG RAN WG1 Meeting #91, R1-1721452, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 28, 2017 (Nov. 28, 2017), XP051363896, 11 Pages, Retrieved from the Internet: URL:http://www.3gpp.org/ftp/Meetings%5F3GPP%5FSYNC/RAN1/Docs/ [retrieved on Nov. 28, 2017], Figures 1-6, Sections 1-8, Sections 2 and 5, Section 5.2.
Qualcomm Incorporated: "Considerations on Differentiating eMBB and URLLC", 3GPP TSG-RAN WG1 #93, 3GPP Draft, R1-1807367 Considerations on Differentiating eMBB and URLLC, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), pp. 1-2, XP051442559, Retrieved from the Internet: URL: https://www.3gpp.org/ftp/tsg_ran/WG1_RL1/TSGR1_93/Docs, [retrieved on May 20, 2018], the whole document.
Supplementary European Search Report—EP19830230—Search Authority—Munich—dated Feb. 22, 2022.
Vivo: "Discussion on CSI Report for URLLC", 3GPP Draft, 3GPP TSG RAN WG1 Meeting #93, R1-1806077, Discussion on CSI Report for URLLC, 3rd Generation Partnership Project (3GPP), Mobile Competence Centre, 650, Route Des Lucioles, F-06921 Sophia-Antipolis Cedex, vol. RAN WG1, No. Busan, Korea, May 21, 2018-May 25, 2018, May 20, 2018 (May 20, 2018), XP051441291, 2 Pages, Retrieved from the Internet: URL: http://www.3gpp.org/ftp/Meetings%5F3GPP%5FSYNC/RAN1/Docs/. [retrieved on May 20, 2018] the whole document, Section 2.
Anonymous: "3rd Generation Partnership Project, Technical Specification Group Radio Access Network, NR, Physical Layer Procedures for Data (Release 15)", 3GPP Standard, Technical Specification, 3GPP TS 38.214, 3rd Generation Partnership Project (3GPP), Mobile Competence Centre, 650, Route Des Lucioles, F-06921 Sophia-Antipolis Cedex, France, vol. RAN WG1, No. V15.2.0, Jun. 29, 2018, XP051474491, pp. 1-95, [retrieved on Jun. 29, 2018], Section 5.2.2.3.1.

* cited by examiner

TECHNIQUES FOR PRIORITIZING CSI REPORTS

CROSS REFERENCES FOR RELATED APPLICATIONS

The present Application is a 371 national phase filing of International Patent Application No. PCT/CN2019/093522 by Huang et al., entitled "TECHNIQUES FOR PRIORITIZING CSI REPORTS," filed Jun. 28, 2019; and to International Application No. PCT/CN2018/093976 by Huang et al., entitled "TECHNIQUES FOR PRIORITIZING CSI REPORTS," filed Jul. 2, 2018, each of which is assigned to the assignee hereof, and each of which is hereby incorporated by reference herein in its entirety.

BACKGROUND

The following relates generally to wireless communication from a user equipment (UE), and more specifically to techniques for prioritizing channel state information (CSI) reporting.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as a UE.

In some wireless communications systems, a UE may be configured to transmit CSI reports. In some cases, CSI reports may collide and try to use the same communication resources, which can lead to problems.

SUMMARY

The described techniques relate to improved methods, systems, devices, and apparatuses that support techniques for prioritizing channel state information (CSI) reporting. Generally, the described techniques provide for determining a priority ranking for CSI reports based on a reliability parameter, a latency parameter, or both of resources allocated to a user equipment (UE). In some wireless communications systems, ultra-reliable low latency communication (URLLC) services may be interspersed with enhanced mobile broadband (eMBB) services. The UE may perform a CSI report prioritization procedure to account for reliability parameters, latency parameters, or both. In some cases, CSI reporting for resources associated URLLC services may receive higher priority than CSI reporting for eMBB services. The UE may be configured to determine reliability parameters, latency parameters, or both based on signaling received from the network or from determining changes to one or more configurations of the UE. In some cases, the priority ranking of the CSI report may be based on a slot set identifier.

A method of wireless communication from a UE is described. The method may include determining a reliability parameter or a latency parameter associated with a CSI report to be transmitted from the UE, determining a priority ranking of the CSI report based on the reliability parameter or the latency parameter, and transmitting the CSI report based on determining the priority ranking of the CSI report.

An apparatus for wireless communication is described. The apparatus may include a processor, memory in electronic communication with the processor, and instructions stored in the memory. The instructions may be executable by the processor to cause the apparatus to determine a reliability parameter or a latency parameter associated with a CSI report to be transmitted from a UE, determine a priority ranking of the CSI report based on the reliability parameter or the latency parameter, and transmit the CSI report based on determining the priority ranking of the CSI report.

Another apparatus for wireless communication is described. The apparatus may include means for determining a reliability parameter or a latency parameter associated with a CSI report to be transmitted from a UE, determining a priority ranking of the CSI report based on the reliability parameter or the latency parameter, and transmitting the CSI report based on determining the priority ranking of the CSI report.

A non-transitory computer-readable medium storing code for wireless communication is described. The code may include instructions executable by a processor to determine a reliability parameter or a latency parameter associated with a CSI report to be transmitted from a UE, determine a priority ranking of the CSI report based on the reliability parameter or the latency parameter, and transmit the CSI report based on determining the priority ranking of the CSI report.

Some examples of the method, apparatuses, and non-transitory computer-readable medium described herein may further include operations, features, means, or instructions for determining the priority ranking of the CSI report may be based on the reliability parameter and the latency parameter.

Some examples of the method, apparatuses, and non-transitory computer-readable medium described herein may further include operations, features, means, or instructions for generating a combined parameter using the reliability parameter and the latency parameter, where determining the priority ranking of the CSI report may be based on the combined parameter.

Some examples of the method, apparatuses, and non-transitory computer-readable medium described herein may further include operations, features, means, or instructions for identifying content in uplink control information, where generating the combined parameter may be based on the content of the uplink control information.

Some examples of the method, apparatuses, and non-transitory computer-readable medium described herein may further include operations, features, means, or instructions for receiving a message that indicates the reliability parameter or the latency parameter or both, where determining the reliability parameter or the latency parameter may be based on receiving the message.

Some examples of the method, apparatuses, and non-transitory computer-readable medium described herein may further include operations, features, means, or instructions for receiving downlink control information that indicates the reliability parameter or the latency parameter or both, where determining the reliability parameter or the latency parameter may be based on receiving the downlink control information.

Some examples of the method, apparatuses, and non-transitory computer-readable medium described herein may further include operations, features, means, or instructions for receiving a Radio Resource Control (RRC) message, where determining the reliability parameter or the latency parameter may be based on receiving the RRC message.

Some examples of the method, apparatuses, and non-transitory computer-readable medium described herein may further include operations, features, means, or instructions for determining a quality of service (QoS) parameter of resources associated with the CSI report, where determining the reliability parameter or the latency parameter may be based on determining the QoS parameter.

Some examples of the method, apparatuses, and non-transitory computer-readable medium described herein may further include operations, features, means, or instructions for determining that resources associated with the CSI report may be allocated for an eMBB service or an URLLC service, where determining the reliability parameter or the latency parameter may be based at least in on the resources being allocated for the eMBB service or the URLLC service.

Some examples of the method, apparatuses, and non-transitory computer-readable medium described herein may further include operations, features, means, or instructions for determining, by the UE, one or more configurations of the UE being modified, where determining the reliability parameter or the latency parameter may be based on determining that the one or more configurations of the UE may be modified.

Some examples of the method, apparatuses, and non-transitory computer-readable medium described herein may further include operations, features, means, or instructions for determining that a new modulation and coding scheme (MCS) table different from an initial MCS table may be configured for the UE, where determining the reliability parameter or the latency parameter may be based on determining that the new MCS table may be configured for the UE.

Some examples of the method, apparatuses, and non-transitory computer-readable medium described herein may further include operations, features, means, or instructions for determining whether a common search space or a UE-specific search space is used to receive downlink control information based at least in part on determining the new MCS table, where determining the reliability parameter or the latency parameter is based at least in part on determining whether the common search space or the UE-specific search space is used to receive the downlink control information.

Some examples of the method, apparatuses, and non-transitory computer-readable medium described herein may further include operations, features, means, or instructions for identifying that a new radio network temporary identifier (RNTI) different from an initial RNTI may be configured for the UE and determining whether a cyclic redundancy check (CRC) of downlink control information may be scrambled using the new RNTI, where determining the reliability parameter or the latency parameter may be based on determining that the CRC of the downlink control information may be scrambled using the new RNTI.

Some examples of the method, apparatuses, and non-transitory computer-readable medium described herein may further include operations, features, means, or instructions for determining a CSI reference signal (CSI-RS) configuration for the UE, where determining the reliability parameter or the latency parameter may be based on determining a CSI-RS configuration for the UE.

In some examples of the method, apparatuses, and non-transitory computer-readable medium described herein, the CSI-RS configuration includes information associated with a density of CSI-RSs, one or more ports used to communicate CSI-RSs, or a periodicity of CSI-RSs, or a combination thereof.

Some examples of the method, apparatuses, and non-transitory computer-readable medium described herein may further include operations, features, means, or instructions for determining a slot set identifier, where determining the priority ranking may be based on the slot set identifier.

Some examples of the method, apparatuses, and non-transitory computer-readable medium described herein may further include operations, features, means, or instructions for weighting the slot set identifier using a first factor that may be different than a second factor used to weight the reliability parameter or the latency parameter, where determining the priority ranking of the CSI report may be based on weighting the slot set identifier.

In some examples of the method, apparatuses, and non-transitory computer-readable medium described herein, the slot set identifier indicates whether the CSI report may be associated with an uplink communication or a downlink communication.

Some examples of the method, apparatuses, and non-transitory computer-readable medium described herein may further include operations, features, means, or instructions for weighting the reliability parameter or the latency parameter using a factor associated with a number of CSI reports, where determining the priority ranking may be based on weighting the reliability parameter or the latency parameter.

In some examples of the method, apparatuses, and non-transitory computer-readable medium described herein, the factor includes a multiplier, a number of component carriers of resources associated with the UE, or a second number of CSI reports associated with each component carrier, or a combination thereof.

Some examples of the method, apparatuses, and non-transitory computer-readable medium described herein may further include operations, features, means, or instructions for determining the priority ranking of the CSI report may be based on the reliability parameter, the latency parameter, a CSI type, a CSI content, a component carrier (CC) index, a CSI report identifier, or a slot set identifier, or a combination thereof.

DETAILED DESCRIPTION

In some wireless communications systems, a user equipment (UE) may be configured to communicate using both enhanced mobile broadband (eMBB) services and ultra reliable low latency communication (URLLC) services. In such systems, channel state information (CSI) reports for both types of services may be multiplexed.

Techniques are described herein for determining a priority ranking for CSI reports based at least in part on a reliability parameter, a latency parameter, or both associated with a UE. In some wireless communications systems, URLLC services may be interspersed or multiplexed with eMBB services. The UE may perform a CSI report prioritization procedure to account for reliability parameters, latency parameters, or both. In some cases, CSI reporting for resources associated URLLC services may receive a different priority (e.g., a higher priority) than resources allocated for eMBB services. The UE may be configured to determine reliability parameters and/or latency parameters based on signaling received from another device or devices, such as the network, or from determining the parameters based on one or more configurations of the UE. In some cases, the priority ranking of the CSI report may be based on a slot set identifier.

Aspects of the disclosure are initially described in the context of a wireless communications systems. Aspects of the disclosure are described in the context of a process flow related to CSI reporting. Aspects of the disclosure are further illustrated by and described with reference to apparatus diagrams, system diagrams, and flowcharts that relate to techniques for prioritizing CSI reports.

Figure 1:
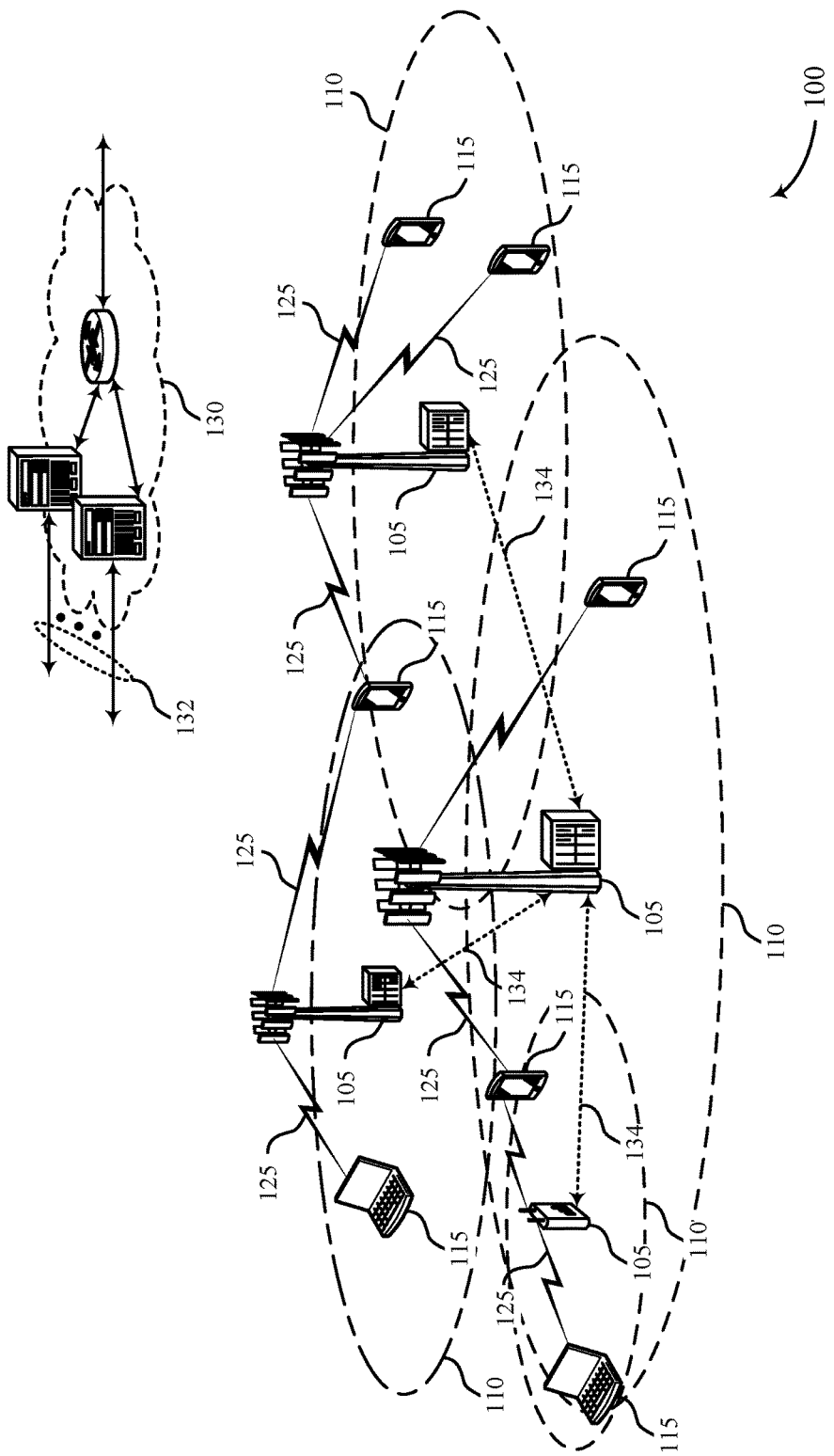
FIG. 1 illustrates an example of a wireless communications system that supports techniques for prioritizing channel state information (CSI) reports in accordance with aspects of the present disclosure.

FIG. 1 illustrates an example of a wireless communications system 100 that supports techniques for prioritizing CSI reports in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The UE 115 may be configured to determine a priority ranking for a CSI report based on a reliability parameter and/or a latency parameter associated with the UE 115. In such cases, CSI reports associated with first reliability parameters (e.g., higher reliability parameters) and/or first latency parameters (e.g., higher reliability parameters) may be given higher priority than CSI reports associated with second reliability parameters (e.g., lower reliability parameters) and/or second latency parameters (e.g., lower reliability parameters). For example, CSI reports associated with a URLLC service may be given higher priority than CSI reports associated with an eMBB service.

Figure 2:
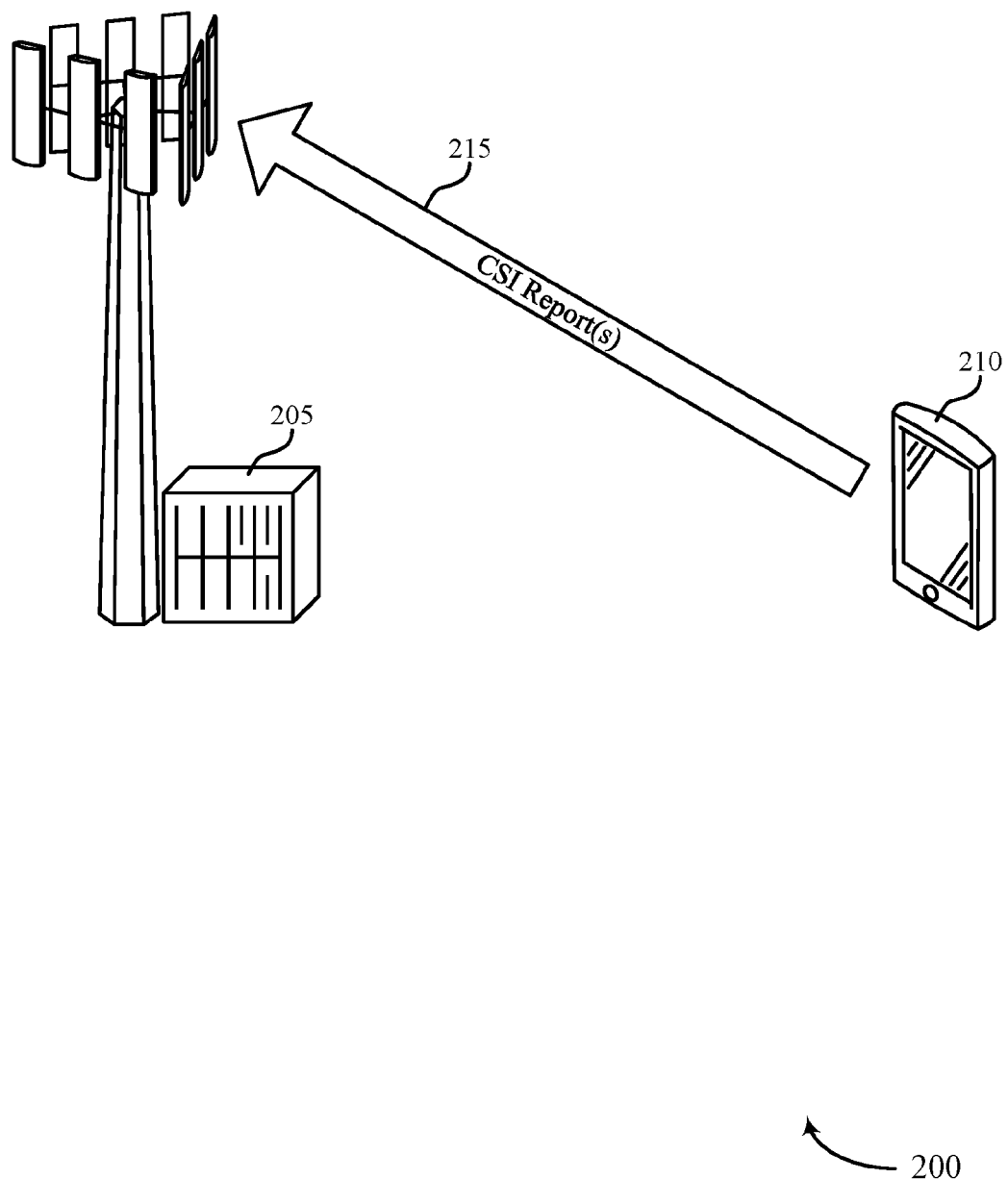
FIG. 2 illustrates an example of a wireless communications system that supports techniques for prioritizing CSI reports in accordance with aspects of the present disclosure.

FIG. 2 illustrates an example of a wireless communications system 200 that supports techniques for prioritizing CSI reports in accordance with aspects of the present disclosure. In some examples, the wireless communications system 200 may implement aspects of the wireless communications system 100. The wireless communications system 200 may include one or more base stations 205 and one or more UEs 210. The base stations 205 may be examples of the base stations 105 described with reference to FIG. 1. The UEs 210 may be examples of the UEs 115 described with reference to FIG. 1.

In the wireless communications system 200, channel conditions experienced by a UE 210 may change. For example, as a UE 210 moves through a coverage area (e.g., down a street), the UE 210 may experience varying radio conditions (e.g., fading). To account for these changing channel conditions, the UE 210 may be configured to report information about channel conditions to the base station 205. The base station 205 may use this information to allocate resources of the wireless communications system 200 to the UE 210 and/or other components.

The information sent by the UE 210 may be in the form of a CSI report 215. CSI information may act as an indicator about how good or bad channel conditions on a specific channel are at a specific time. CSI may include a channel quality indicator (CQI), a precoding matrix index (PMI), and a rank indicator (RI). To generate a CSI report, the UE 210 may receive and analyze one or more CSI reference signals (CSI-RSs) and/or other reference signals and determine feedback information (e.g., CQI, PMI, or RI) based on those reference signals.

A UE 210 may be configured to transmit CSI reports 215 on a periodic basis, a semi-persistent basis, or an aperiodic basis. For example, for periodic transmissions, an RRC message may configure a time interval between the transmission of CSI reports 215. For aperiodic transmissions, the base station 205 may request that the UE 210 transmit the CSI report 215. In some cases, CSI reports 215 may be used for portions of a wireless spectrum. For example, a CSI report 215 may be used for a portion of the frequency band spectrum allocated to the UE 210. In other examples, a CSI report 215 may be for a sub-band or some or portion of the spectrum allocated to the UE 210.

In some cases, the UE 210 may be requested to provide a plurality of CSI reports to the base station 205 and/or the network more generally. In such cases, the UE 210 may be configured to multiplex the CSI reports. In some cases, the UE 210 may generate a priority ranking of the CSI reports 215 to facilitate multiplexing the CSI reports and determining which CSI reports are more likely to be transmitted using limited resources. For example, two CSI reports may collide if the time occupancy of the physical channels scheduled to carry the CSI reports overlap in at least on OFDM symbol and are transmitted on the carrier. When the UE 210 attempts to transmit colliding CSI reports, the UE 210 may use priority rankings to resolve the collision to enable more effective and/or efficient communications.

In some wireless communications systems, CSI reports 215 may be ranked or prioritized based on the CSI type, the CSI content, the CC index, or the CSI report identifier, or a combination thereof. Examples of the CSI type may include aperiodic CSI (A-CSI), semi-persistent CSI (SP-CSI) on a physical uplink shared channel (PUSCH), SP-CS on a physical uplink control channel (PUCCH), or periodic CSI (P-CSI). Examples of CSI content may include narrowband CQI, wideband CQI, PMI, RI, received signal received power (RSRP), received signal received quality (RSRQ), or received signal strength indicator (RSSI).

Techniques are described herein for determining a priority ranking for CSI reports based on a reliability parameter, a latency parameter, or both of resources allocated to the UE 210. In some wireless communications systems, URLLC services may be interspersed with eMBB services. CSI report prioritization procedures may be configured to account for reliability parameters, latency parameters, or both. In some cases, CSI reporting for resources allocated to URLLC services may receive higher priority than CSI reporting for eMBB services. The UE 210 may be configured to determine reliability parameters and/or latency parameters based on signaling received from the network or from determining changes to one or more configurations of the UE 210. In some cases, the priority ranking of the CSI report may be based on a slot set identifier.

Figure 3:
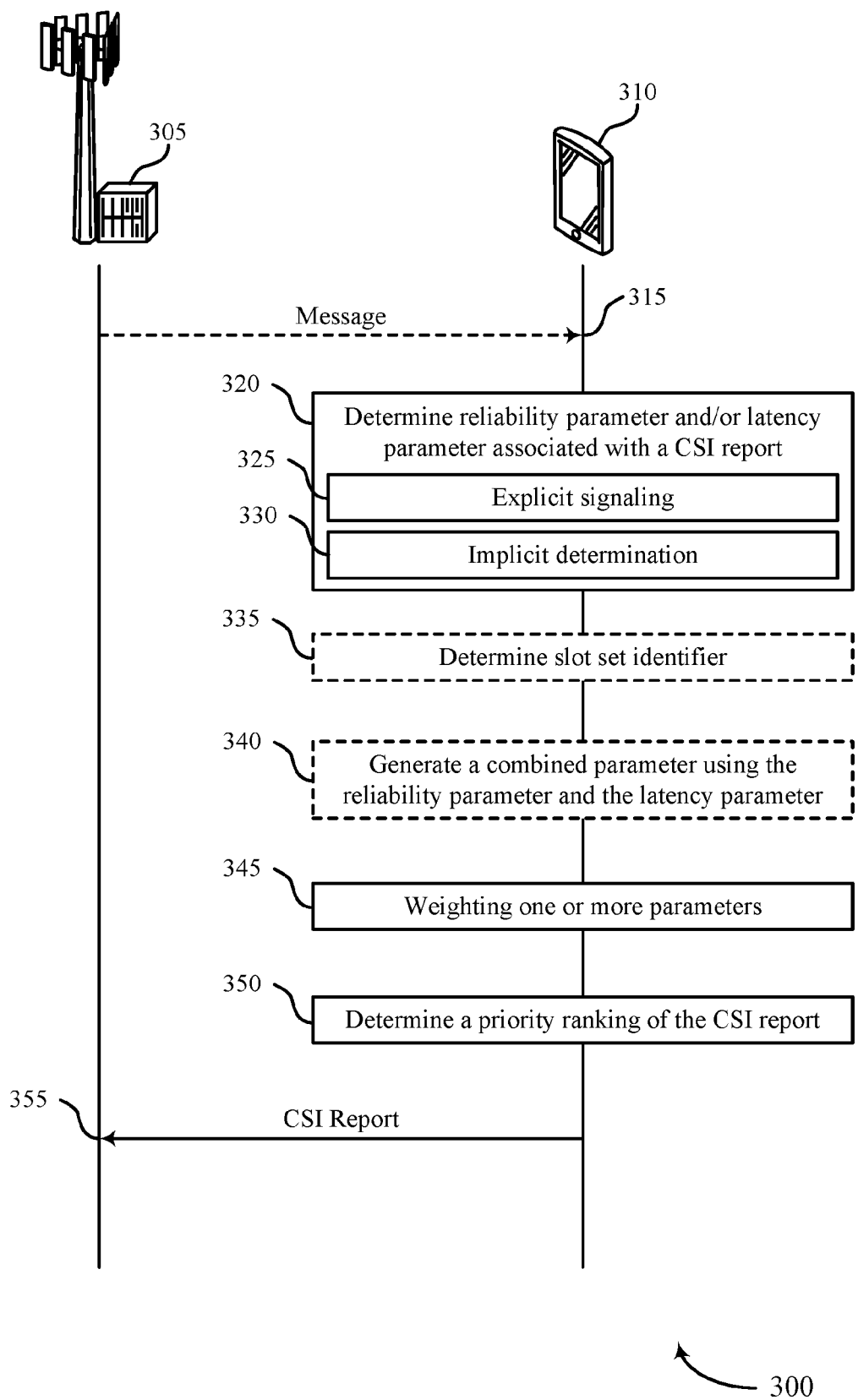
FIG. 3 illustrates an example of a process flow that supports techniques for prioritizing CSI reports in accordance with aspects of the present disclosure.

FIG. 3 illustrates an example of a process flow 300 that supports techniques for prioritizing CSI reports in accordance with aspects of the present disclosure. In some examples, the process flow 300 may implement aspects of the wireless communications systems 100 and 200. The process flow 300 may include functions performed and communications exchanged between a base station 305 and a UE 310. The base station 305 may be an example of the base stations 105 and 205 described with reference to FIGS. 1 and 2. The UE 310 may be an example of the UEs 115 and 210 described with reference to FIGS. 1 and 2.

The process flow 300 may illustrate techniques for determining a priority ranking of a CSI report based on at least one of a reliability parameter or a latency parameter associated with the CSI report. For example, CSI reports that are associated with URLLC services may be given a higher priority ranking than CSI reports associated with eMBB services, among other examples.

The base station 305 may optionally transmit a message 315 to the UE 310. The message 315 may include information related to determine a priority ranking for a CSI report 355. In some cases, the message 315 may be an example of downlink control information or a radio resource control (RRC) message. In some examples, the message 315 may be a grant of resources and may indicate a service type of the resources, a quality of service (QoS) parameter associated with the resources, or other configurations of the UE 310. In some cases, the message 315 may include a request for a CSI report (e.g., an aperiodic CSI report). In some cases, the message 315 may include information that causes the UE 310 to configure CSI reports (e.g., periodic CSI reports).

At block 320, the UE 310 may determine a reliability parameter, a latency parameter, or both associated with a CSI report 355. To determine these parameters, the UE 310 may use explicit signaling at block 325 and/or may use implicit determinations at block 330.

At block 325, the UE 310 may determine the reliability parameter and/or the latency parameter associated with the CSI report 355 based on information included in the message 315. In some cases, the UE 310 may receive downlink control information that indicates the reliability parameter, the latency parameter, or both. In such cases, the message 315 may be an example of the downlink control information. The downlink control information may include one or more bits that indicate a trigger for an aperiodic CSI report. In some cases, the downlink control information may indicate that the aperiodic CSI report is associated with a URLLC service. In some cases, the field of the downlink control information configured to trigger an A-CSI report or CSI report more generally may include one or more additional bits to indicate a redundancy parameter and/or a latency parameter associated with the CSI report. In some cases, the downlink control information may include a new field of one or more bits to indicate a redundancy parameter and/or a latency parameter associated with a CSI report.

In some cases, the UE 310 may receive an RRC message that indicates the reliability parameter, the latency parameter, or both. In such cases, the message 315 may be an example of the RRC message. The RRC message may be used to configure periodic CSI reports and/or semi-persistent CSI reports. In some cases, the RRC message may indicate that the periodic CSI reports and/or the semi-persistent CSI reports are associated with a URLLC service. The RRC message may configure periodic CSI reports and/or semi-persistent CSI reports associated with a URLLC service on certain component carriers, certain slots, certain symbols, or a combination thereof.

In some cases, the UE 310 may receive a grant of resources from the base station 305 that indicates the reliability parameter, the latency parameter, or both. In such cases, the message 315 may be an example of the grant of resources. The grant of resources may include a QoS parameter associated with the CSI report or associated with the granted resources. The UE 310 may determine the QoS parameter based on receiving the message 315. The UE 310 may determine the reliability parameter, the latency parameter, or both based on the QoS parameter.

In some cases, the UE 310 may determine a service type of resources allocated to the UE 310 by the base station 305. A service type may include eMBB, URLLC, and/or mMTC. The UE 310 may determine that resources associated with the CSI report 355 are allocated for an eMBB service or a URLLC service. The UE 310 may determine the reliability parameter and/or the latency parameter associated with the CSI report 355 based on determining the service type.

At block 330, the UE 310 may determine the reliability parameter and/or the latency parameter based on determinations made by the UE 310. In some cases, the UE 310 may determine that one or more configurations of the UE 310 have been modified. The UE 310 may determine the reliability parameter and/or the latency parameter based on the modifications in these configurations. For example, a new block error rate (BLER) table may indicate the reliability parameter and/or the latency parameter.

In some cases, the UE 310 may determine that a new modulation and coding scheme (MCS) table different than an initial MCS table is configured for the UE 310. The new MCS table may be associated with URLLC services or reliable communications or low-latency communications. The UE 310 may determine the reliability parameter and/or the latency parameter based on the new MCS table being configured or based on the content of the new MCS table or both.

In some cases, the UE 310 may adjust the initial MCS. The adjusted MCS table may be associated with URLLC services or reliable communications or low-latency communications. The UE 310 may determine the reliability parameter and/or the latency parameter based on the adjusted MCS table being configured or based on the content of the adjusted MCS table, or both.

In some cases, the UE 310 may identify that a new radio network temporary identifier (RNTI) different than an initial RNTI is configured for the UE 310. In some cases, the UE 310 may identify that the initial RNTI is adjusted. The new RNTI or the adjusted RNTI may be associated with URLLC services or reliable communications or low-latency communications. The UE 310 may determine the reliability parameter and/or the latency parameter based on the new RNTI or the adjusted RNTI being configured, the content of the new RNTI or the adjusted RNTI, or both. The UE 310 may determine whether downlink control information is scrambled using the new RNTI, the adjusted RNTI, or the initial RNTI. In some cases, cyclic redundancy check (CRC) bits of the downlink control information are scrambled using the new RNTI, the adjusted RNTI, or the initial RNTI. In such cases, the UE 310 may generate CRC bits based on information bits of the downlink control information, scramble the CRC bits with some RNTI, concatenate the scrambled CRC bits and the information bits of the downlink control information, and encode the string of concatenated bits. The UE 310 may determine the reliability parameter and/or the latency parameter based on determining that the at least a portion of the downlink control information (e.g., CRC) is scrambled using the new RNTI, the adjusted RNTI, or both. In some cases, the UE 310 may determine that a CSI report associated with a URLLC service is to be generated and transmitted based on a new RNTI or the adjusted RNTI.

In some cases, when the new RNTI is configured (via RRC), RNTI scrambling of the CRC of the downlink control information may be used to determine reliability parameter and/or the latency parameter of the CSI report 355. In some examples, A-CSI or SP-CSI with a higher reliability parameter and/or a higher reliability parameter may be triggered or activated by receiving downlink control information whose CRC is scrambled with the new RNTI. Similarly, A-CSI or SP-CSI with a lower reliability parameter and/or a lower reliability parameter may be triggered or activated by receiving downlink control information whose CRC is scrambled with the old RNTI In some cases, when a new RNTI or an adjusted RNTI is not configured, an RRC parameter may be used to configure a new MCS table or an adjusted MCS table. When the new MCS table is configured, the UE 310 may identify a search space where a downlink control information is received. For example, the downlink control information may be received in a common search space (CSS), and/or a UE-specific search space (USS). The UE 310 may determine the reliability parameter and/or the latency parameter associated with the CSI report 355 based on identifying the search space used to receive the downlink control information. In other words, the UE 310 may monitor two downlink control information search spaces (e.g., CSS and USS). If downlink control information (DCI) is found in CSS, the CSI reports triggered or activated by that DCI may have a lower priority (e.g., lower reliability parameter and/or higher latency parameter). If a DCI is found in USS, the CSI reports triggered or activated by that DCI may have a higher priority (e.g., a higher reliability parameter and/or a lower latency parameter). In some cases, A-CSI or SP-CSI that is triggered or activated by downlink control formats 0_0/1_0/0_1/1_1 in USS may have a higher priority than A-CSI or SP-CSI that is triggered or activated by downlink control formats 0_0/1_0 in CSS. In other cases, USS and CSS may indicate the same reliability parameters and/or latency parameters for the CSI report 355.

In some cases, the UE 310 may determine a CSI reference signal (CSI-RS) configuration for the UE 310. Some CSI-RS configuration may be associated with eMBB services while others may be associated with URLLC services. The UE 310 may determine the reliability parameter and/or the latency parameter based on the CSI-RS configuration. The CSI-RS configuration may include information associated with a density of CSI-RSs, a pattern of CSI-RSs, one or more ports used to communicate CSI-RSs, or a periodicity of CSI-RSs, or a combination thereof.

At block 335, the UE 310 may determine a slot set identifier associated with the CSI report 355. The slot set identifier may indicate whether the CSI report 355 is associated with an uplink communication or a downlink communication. The priority ranking of the CSI report 355 may be determined using the slot set identifier as well as reliability indicator and/or the latency parameter.

At block 340, the UE 310 may optionally generate a combined parameter using at least the reliability parameter and the latency parameter. In some cases, the UE 310 may use the reliability parameter or the latency parameter (in some cases, only the reliability parameter or only the latency parameter) to determine the priority ranking of the CSI report 355. In other cases, the UE 310 may use both the reliability parameter and the latency parameter to determine the priority ranking. In yet other cases, such as at block 340, the UE 310 may combine the reliability parameter and the latency parameter into a combined parameter and use that combined parameter to determine the priority ranking of the CSI report 355.

In some cases, the combined parameter may include content of uplink control information as well as the reliability parameter and the latency parameter associated with the CSI report 355. The content of uplink control information may include a scheduling request, a HARQ acknowledgement (ACK) or HARQ negative acknowledgment (NACK), or CQI. At least a portion of the content of the uplink control information (UCI) may be included in the combined parameter. In some cases, the combined parameter may include the slot set identifier.

At block 345, the UE 310 may weight one or more parameters to generate the priority ranking. Weighting may include applying a factor to the parameter. In some cases, the parameter may be multiplied by the factor. In some cases, the factor may be associated with a number of CSI reports configured for the UE 310. In some cases, the factor may include a numeric multiplier, a number of component carriers of resources associated with the UE 310, a second number of CSI reports associated with each component, or a combination thereof. Additional examples of the weighting are described herein.

At block 350, the UE 310 may determine a priority ranking of the CSI report 355 based on one or more parameters. For example, the UE 310 may determine the priority ranking of the CSI report 355 based on the reliability parameter, the latency parameter, a CSI type, a CSI content, a component carrier (CC) index, a CSI report identifier, or a slot set identifier, or a combination thereof.

Equation 1 illustrates how the UE 310 may prioritize CSI reports for intra-UE eMBB and URLLC multiplexing. In Equation 1, a CSI report associated with a URLLC service may have priority over a CSI report associated with an eMBB service, regardless of the CSI type.

$$Pri_{iCSI}(x,y,k,c,s) = 8*N_{cells}*M_s*x + 2*N_{cells}*M_s*y + N_{cells}*M_s*k + M_s*c + s \quad (1)$$

In Equation 1, $Pri_{iCSI}$ may represent the priority ranking of the CSI report 355. The parameters x, y, k, c, and s may represent different inputs of the priority ranking equation. The parameters may represent the CSI report identifier (e.g., a reportConfigID), the parameter c may represent the component carrier index (e.g., a service cell index), the parameter k may represent the CSI content (e.g., k=0 for CSI reports carrying L1-RSRP and k=1 for CSI reports not carrying L1-RSRP), and the parameter y may represent the CSI type (e.g., A-CSI, SP-CSI on PUSCH, SP-CSI on PUCCH, or P-CSI). The parameter x may represent the service type (e.g., eMBB or URLLC), the reliability parameter, the latency parameter, or the combined parameter that includes at least the reliability parameter and the latency parameter. For example, x may equal 0 if a new CSI table is associated with the CSI and x may equal 1 otherwise. The variable $N_{cells}$ may represent the number of components carriers associated with the UE. In some cases, the variable $N_{cells}$ may be the value of the parameter maxNrofServingCells. The variable $M_s$ may represent the number of CSI reports associated with each component carrier associated with the UE 310. In some cases, the variable $M_s$ may be the value of the parameter maxNrofCSI-ReportConfigurations. In some cases, Equation 1 may include a parameter associated with the slot set identifier. In such cases, a factor may or may not be applied to the parameter associated with the slot set identifier.

Different factors may be applied to one or more or each parameter to determine the priority ranking of the CSI report 355. The factors may weight each parameter differently during the priority ranking determination. Applying different factors may cause different parameters to become more important during the determination of the priority ranking. For example, the factor $8*N_{cells}*M_s$ may be applied to the parameter x and no factor may be applied to the parameter s. In such examples, the parameter x may be weighted to have a higher value and a higher influence than the parameter s. Examples of other factors in Equation 1 may include $2*N_{cells}*M_s$, $N_{cells}*M_s$, $M_s$, or a combination thereof. While an example of factors is shown in Equation 1, any factor may be applied to any parameter.

Equation 1 illustrates a single parameter x used to denote the reliability parameter, the latency parameter, the combined parameter, or some other related parameter. In some cases, an equation for the priority ranking of CSI reports may include a parameter r for reliability and a separate parameter 1 for latency. These parameters may replace the parameter x in Equation 1 in some cases. Factors may be applied to the parameter r and/or the parameter 1. In some cases, the same factor is applied to both the parameter r and the parameter 1. In some cases, different factors may be applied to the parameter r and the parameter 1. An example of the factors applied to the parameter r and/or the parameter 1 may include $8*N_{cells}*M_s$ or $12*8*N_{cells}*M_s$.

Equation 2 and/or Table 1 illustrate how the UE 310 may jointly consider a reliability parameter, the latency parameter, and content of the uplink control information to determine the priority ranking of the CSI report 355.

$$Pri_{iCSI}(x,y,k,c,s)=12*8*N_{cells}*M_s*x+2*N_{cells}*M_s*y+N_{cells}*M_s*k+M_s*c+s \qquad (2)$$

In Equation 2, the parameter x may jointly depend on the service type (e.g., eMBB or URLLC) and the content of the uplink control information. The other variables, parameters, and factors of Equation 2 may be similarly embodied as the variables, parameters, and factors described with reference to Equation 1. An example of values of the parameter x are shown in Table 1.

TABLE 1

|  | RI | L | WB CQI | SB CQI | CRI | PMI |
|---|---|---|---|---|---|---|
| Services with high reliability and low latency requirements | 0 | 2 | 4 | 10 | 6 | 7 |
| Other services | 1 | 3 | 5 | 11 | 8 | 9 |

Like Equation 1, Equation 2 may include a parameter r and/or a parameter 1 instead of the parameter x and any factors may applied to these parameters. In some cases, Equation 2 may include a parameter associated with the slot set identifier. In such cases, a factor may or may not be applied to the parameter associated with the slot set identifier.

The UE 310 may transmit the CSI report 355 based on the priority ranking of the CSI report 355. The UE 310 may transmit the CSI report 355 to the base station 305. The base station 305 may use the CSI report 355 to determine channel conditions and to adjust communication parameters or to allocate resources to UEs.

Figure 4:
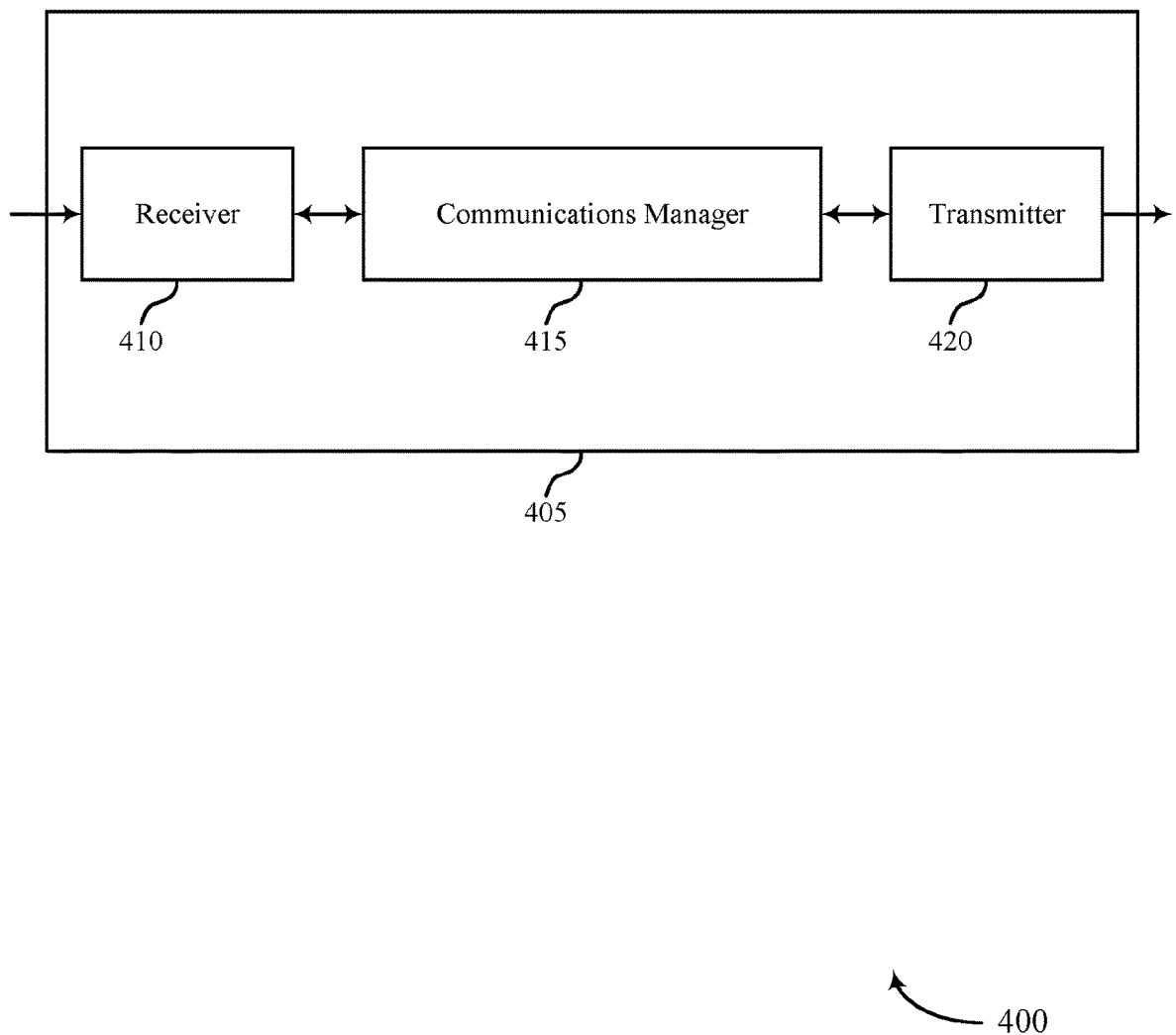
FIGS. 4 and 5 show block diagrams of devices that support techniques for prioritizing CSI reports in accordance with aspects of the present disclosure.

FIG. 4 shows a block diagram 400 of a device 405 that supports techniques for prioritizing CSI reports in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to techniques for prioritizing CSI reports, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may determine a reliability parameter or a latency parameter associated with a CSI report to be transmitted from the UE, determine a priority ranking of the CSI report based on the reliability parameter or the latency parameter, and transmit the CSI report based on determining the priority ranking of the CSI report. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
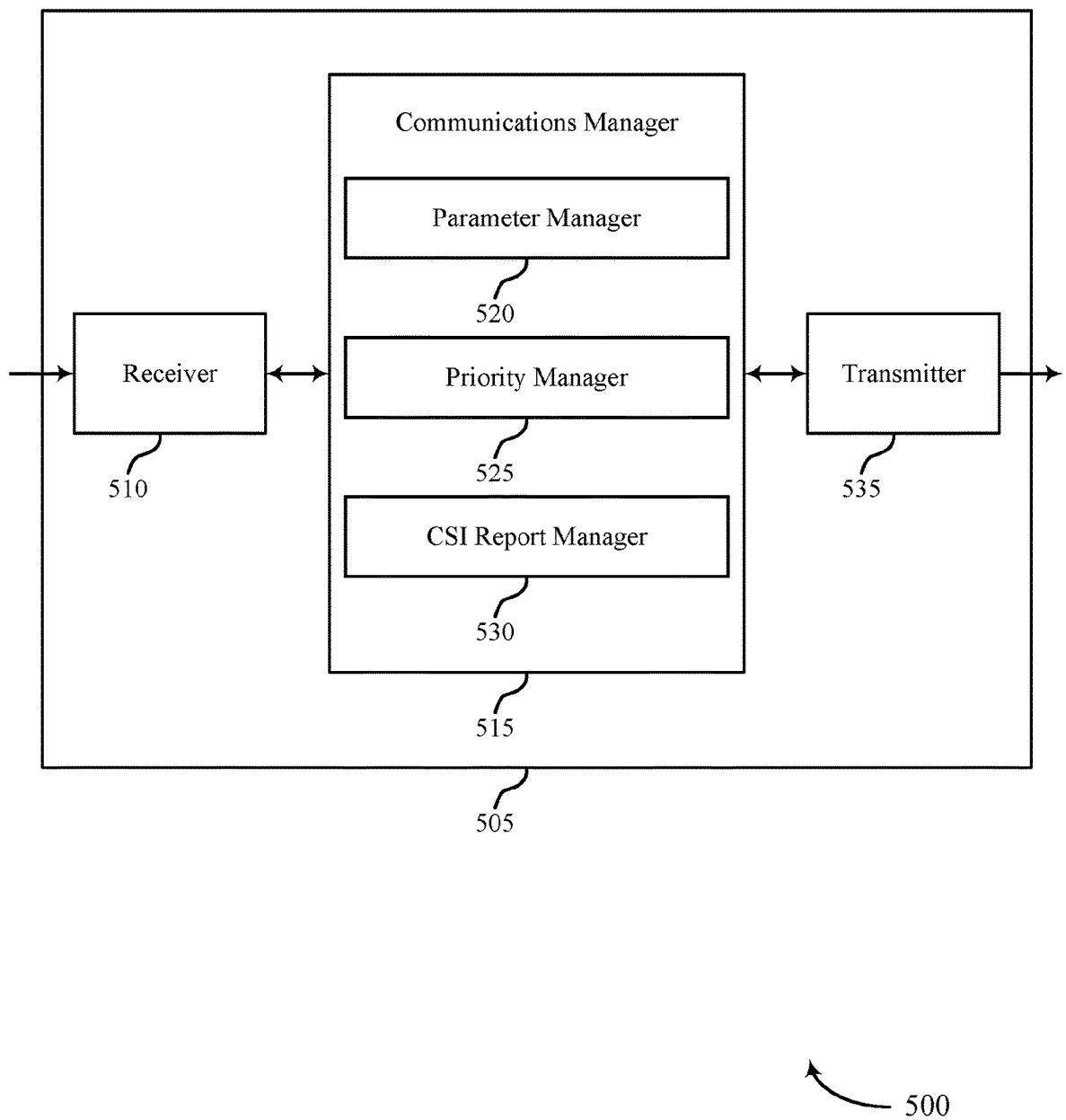

FIG. 5 shows a block diagram 500 of a device 505 that supports techniques for prioritizing CSI reports in accordance with aspects of the present disclosure. The device 505 may be an example of aspects of a device 405 or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to techniques for prioritizing CSI reports, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a parameter manager 520, a priority manager 525, and a CSI report manager 530. The communications manager 515 may be an example of aspects of the communications manager 710 described herein.

The parameter manager 520 may determine a reliability parameter or a latency parameter associated with a CSI report to be transmitted from the UE. The priority manager 525 may determine a priority ranking of the CSI report based on the reliability parameter or the latency parameter. The CSI report manager 530 may transmit the CSI report based on determining the priority ranking of the CSI report.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
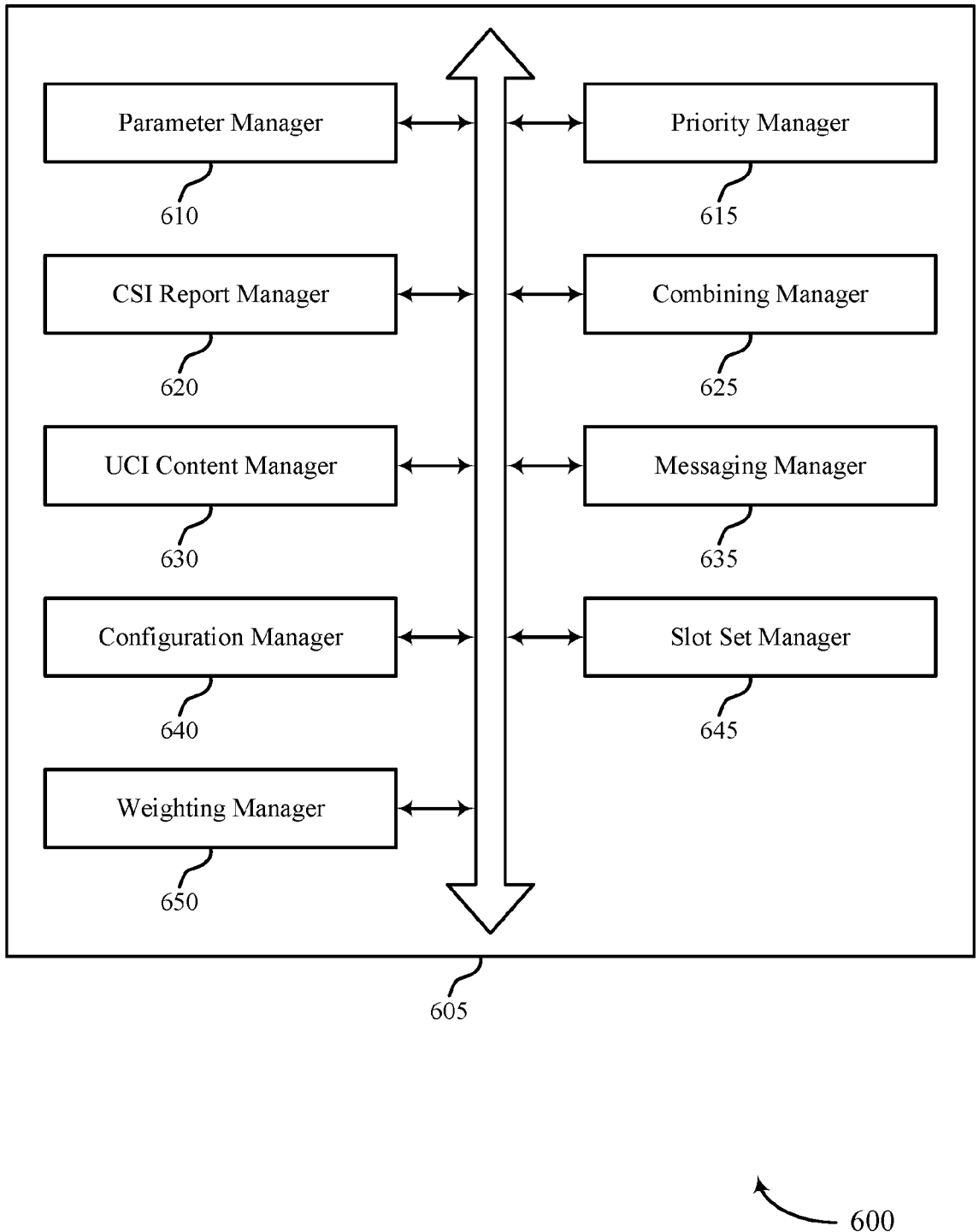
FIG. 6 shows a block diagram of a communications manager that supports techniques for prioritizing CSI reports in accordance with aspects of the present disclosure.

FIG. 6 shows a block diagram 600 of a communications manager 605 that supports techniques for prioritizing CSI reports in accordance with aspects of the present disclosure. The communications manager 605 may be an example of aspects of a communications manager 415, a communications manager 515, or a communications manager 710 described herein. The communications manager 605 may include a parameter manager 610, a priority manager 615, a CSI report manager 620, a combining manager 625, an UCI content manager 630, a messaging manager 635, a configuration manager 640, a slot set manager 645, and a weighting manager 650. Each of these modules may communicate, directly or indirectly, with one another (e.g., via one or more buses).

The parameter manager 610 may determine a reliability parameter or a latency parameter associated with a CSI report to be transmitted from the UE.

The priority manager 615 may determine a priority ranking of the CSI report based on the reliability parameter or the latency parameter. In some examples, the priority manager 615 may determine the priority ranking of the CSI report is based on the reliability parameter and the latency parameter. In some examples, the priority manager 615 may determine the priority ranking of the CSI report is based on the reliability parameter, the latency parameter, a CSI type, a CSI content, a CC index, a CSI report identifier, or a slot set identifier, or a combination thereof.

The CSI report manager 620 may transmit the CSI report based on determining the priority ranking of the CSI report.

The combining manager 625 may generate a combined parameter using the reliability parameter and the latency parameter, where determining the priority ranking of the CSI report is based on the combined parameter.

The UCI content manager 630 may identify content in uplink control information, where generating the combined parameter is based on the content of the uplink control information.

The messaging manager 635 may receive a message that indicates the reliability parameter or the latency parameter or both, where determining the reliability parameter or the latency parameter is based on receiving the message. In some examples, the messaging manager 635 may receive downlink control information that indicates the reliability parameter or the latency parameter or both, where determining the reliability parameter or the latency parameter is based on receiving the downlink control information.

In some examples, the messaging manager 635 may receive an RRC message, where determining the reliability parameter or the latency parameter is based on receiving the RRC message. In some examples, the messaging manager 635 may determine a QoS parameter of resources associated with the CSI report, where determining the reliability parameter or the latency parameter is based on determining the QoS parameter. In some examples, the messaging manager 635 may determine that resources associated with the CSI report are allocated for an eMBB service or an URLLC service, where determining the reliability parameter or the latency parameter is based at least in on the resources being allocated for the eMBB service or the URLLC service.

The configuration manager 640 may determine, by the UE, one or more configurations of the UE being modified, where determining the reliability parameter or the latency parameter is based on determining that the one or more configurations of the UE are modified. In some examples, the configuration manager 640 may determine that a new MCS table different from an initial MCS table is configured for the UE, where determining the reliability parameter or the latency parameter is based on determining that the new MCS table is configured for the UE. In some examples, the configuration manager 640 may determine whether a common search space or a UE-specific search space is used to receive downlink control information based at least in part on determining the new MCS table, where determining the reliability parameter or the latency parameter is based at least in part on determining whether the common search space or the UE-specific search space is used to receive the downlink control information. In some examples, the configuration manager 640 may identify that a new radio network temporary identifier (RNTI) different from an initial RNTI is configured for the UE.

In some examples, the configuration manager 640 may determine whether a CRC of downlink control information is scrambled using the new RNTI, where determining the reliability parameter or the latency parameter is based on determining that the CRC of the downlink control information is scrambled using the new RNTI. In some examples, the configuration manager 640 may determine a CSI-RS configuration for the UE, where determining the reliability parameter or the latency parameter is based on determining a CSI-RS configuration for the UE. In some cases, the CSI-RS configuration includes information associated with a density of CSI-RSs, one or more ports used to communicate CSI-RSs, or a periodicity of CSI-RSs, or a combination thereof.

The slot set manager 645 may determine a slot set identifier, where determining the priority ranking is based on the slot set identifier. In some examples, the slot set manager 645 may weigh the slot set identifier using a first factor that is different than a second factor used to weight the reliability parameter or the latency parameter, where determining the priority ranking of the CSI report is based on weighting the slot set identifier. In some cases, the slot set identifier indicates whether the CSI report is associated with an uplink communication or a downlink communication.

The weighting manager 650 may weigh the reliability parameter or the latency parameter using a factor associated with a number of CSI reports, where determining the priority ranking is based on weighting the reliability parameter or the latency parameter. In some cases, the factor includes a multiplier, a number of component carriers of resources associated with the UE, or a second number of CSI reports associated with each component carrier, or a combination thereof.

Figure 7:
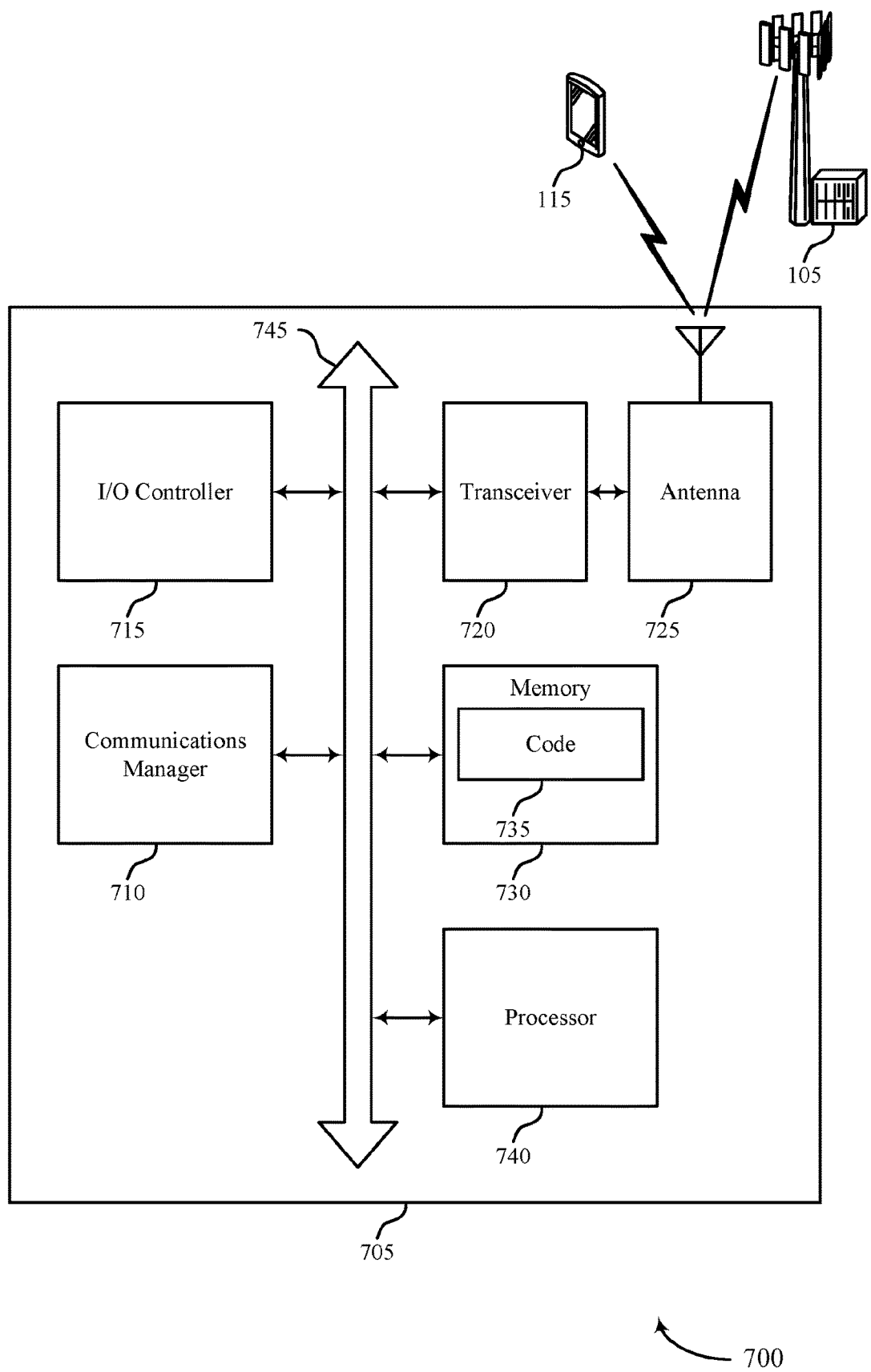
FIG. 7 shows a diagram of a system including a device that supports techniques for prioritizing CSI reports in accordance with aspects of the present disclosure.

FIG. 7 shows a diagram of a system 700 including a device 705 that supports techniques for prioritizing CSI reports in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may determine a reliability parameter or a latency parameter associated with a CSI report to be transmitted from the UE, determine a priority ranking of the CSI report based on the reliability parameter or the latency parameter, and transmit the CSI report based on determining the priority ranking of the CSI report.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for prioritizing CSI reports).

The code 735 may include instructions to implement aspects of the present disclosure, including instructions to support wireless communication from a UE. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
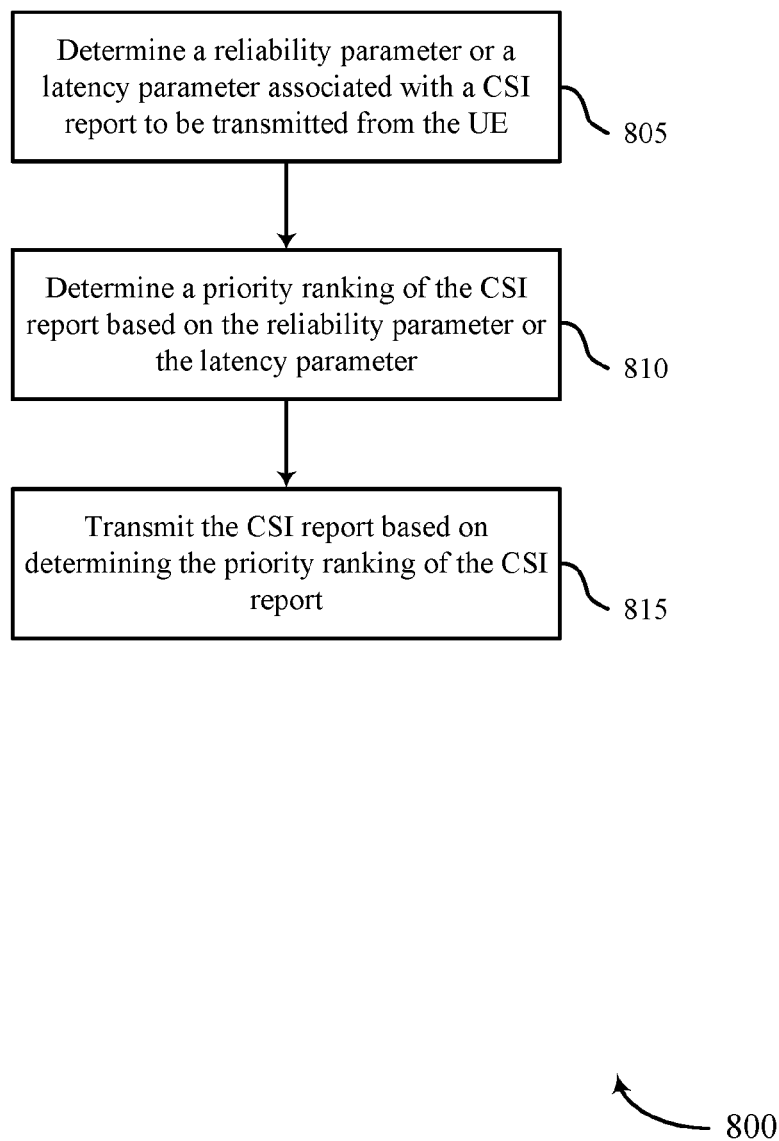
FIGS. 8 through 11 show flowcharts illustrating methods that support techniques for prioritizing CSI reports in accordance with aspects of the present disclosure.

FIG. 8 shows a flowchart illustrating a method 800 that supports techniques for prioritizing CSI reports in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 805, the UE may determine a reliability parameter or a latency parameter associated with a CSI report to be transmitted from the UE. The operations of 805 may be performed according to the methods described herein. In some examples, aspects of the operations of 805 may be performed by a parameter manager as described with reference to FIGS. 4 through 7.

At 810, the UE may determine a priority ranking of the CSI report based on the reliability parameter or the latency parameter. The operations of 810 may be performed according to the methods described herein. In some examples, aspects of the operations of 810 may be performed by a priority manager as described with reference to FIGS. 4 through 7.

At 815, the UE may transmit the CSI report based on determining the priority ranking of the CSI report. The operations of 815 may be performed according to the methods described herein. In some examples, aspects of the operations of 815 may be performed by a CSI report manager as described with reference to FIGS. 4 through 7.

Figure 9:
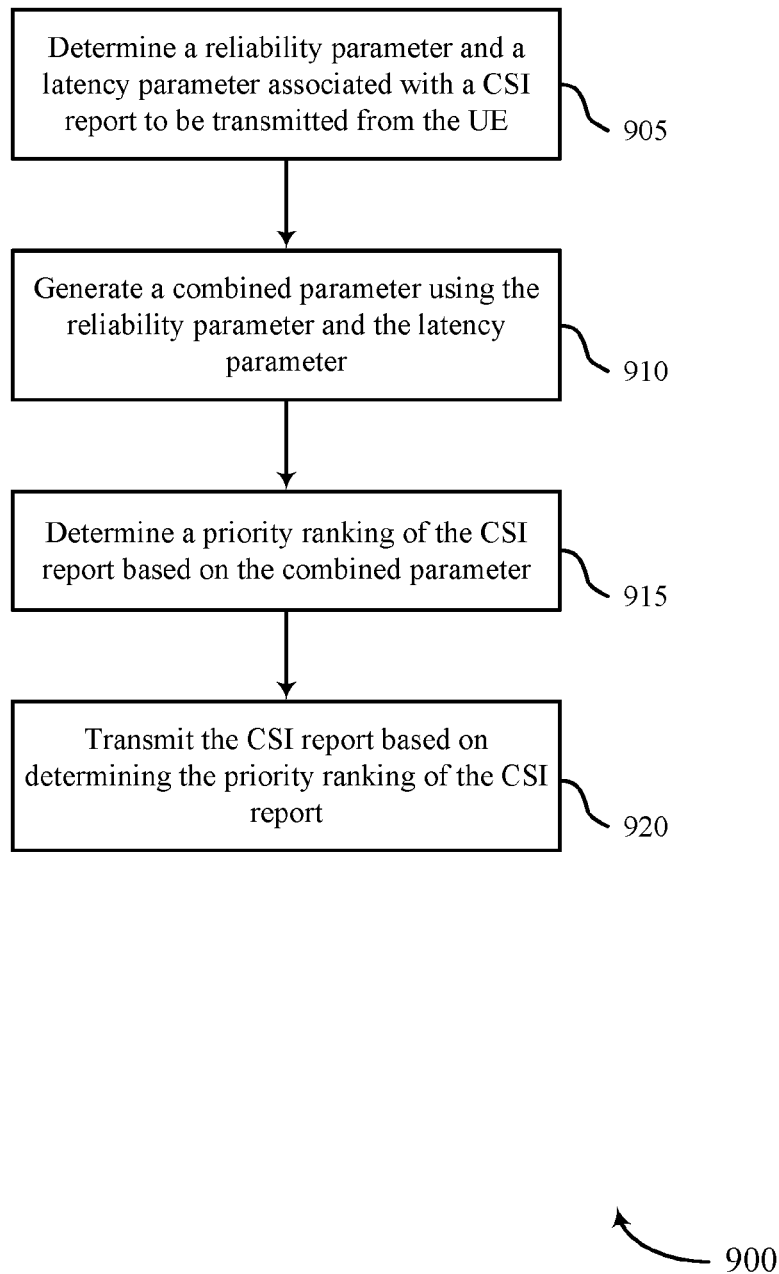

FIG. 9 shows a flowchart illustrating a method 900 that supports techniques for prioritizing CSI reports in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 905, the UE may determine a reliability parameter and a latency parameter associated with a CSI report to be transmitted from the UE. The operations of 905 may be performed according to the methods described herein. In some examples, aspects of the operations of 905 may be performed by a parameter manager as described with reference to FIGS. 4 through 7.

At 910, the UE may generate a combined parameter using the reliability parameter and the latency parameter. The operations of 910 may be performed according to the methods described herein. In some examples, aspects of the operations of 910 may be performed by a combining manager as described with reference to FIGS. 4 through 7.

At 915, the UE may determine a priority ranking of the CSI report based on the combined parameter. The operations of 915 may be performed according to the methods described herein. In some examples, aspects of the operations of 915 may be performed by a priority manager as described with reference to FIGS. 4 through 7.

At 920, the UE may transmit the CSI report based on determining the priority ranking of the CSI report. The operations of 920 may be performed according to the methods described herein. In some examples, aspects of the operations of 920 may be performed by a CSI report manager as described with reference to FIGS. 4 through 7.

Figure 10:
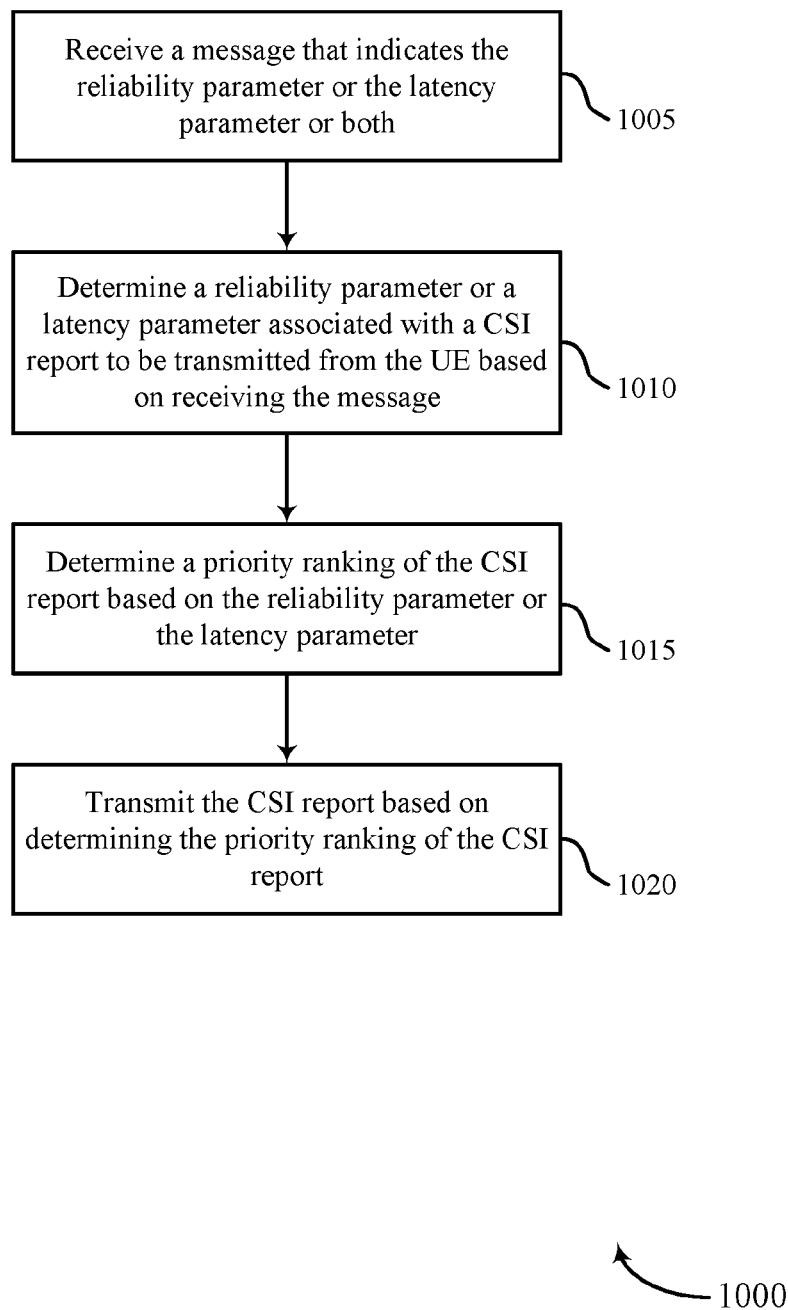

FIG. 10 shows a flowchart illustrating a method 1000 that supports techniques for prioritizing CSI reports in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1005, the UE may receive a message that indicates the reliability parameter or the latency parameter or both. The operations of 1005 may be performed according to the methods described herein. In some examples, aspects of the operations of 1005 may be performed by a messaging manager as described with reference to FIGS. 4 through 7.

At 1010, the UE may determine a reliability parameter or a latency parameter associated with a CSI report to be transmitted from the UE based on receiving the message. The operations of 1010 may be performed according to the methods described herein. In some examples, aspects of the operations of 1010 may be performed by a parameter manager as described with reference to FIGS. 4 through 7.

At 1015, the UE may determine a priority ranking of the CSI report based on the reliability parameter or the latency parameter. The operations of 1015 may be performed according to the methods described herein. In some examples, aspects of the operations of 1015 may be performed by a priority manager as described with reference to FIGS. 4 through 7.

At 1020, the UE may transmit the CSI report based on determining the priority ranking of the CSI report. The operations of 1020 may be performed according to the methods described herein. In some examples, aspects of the operations of 1020 may be performed by a CSI report manager as described with reference to FIGS. 4 through 7.

Figure 11:
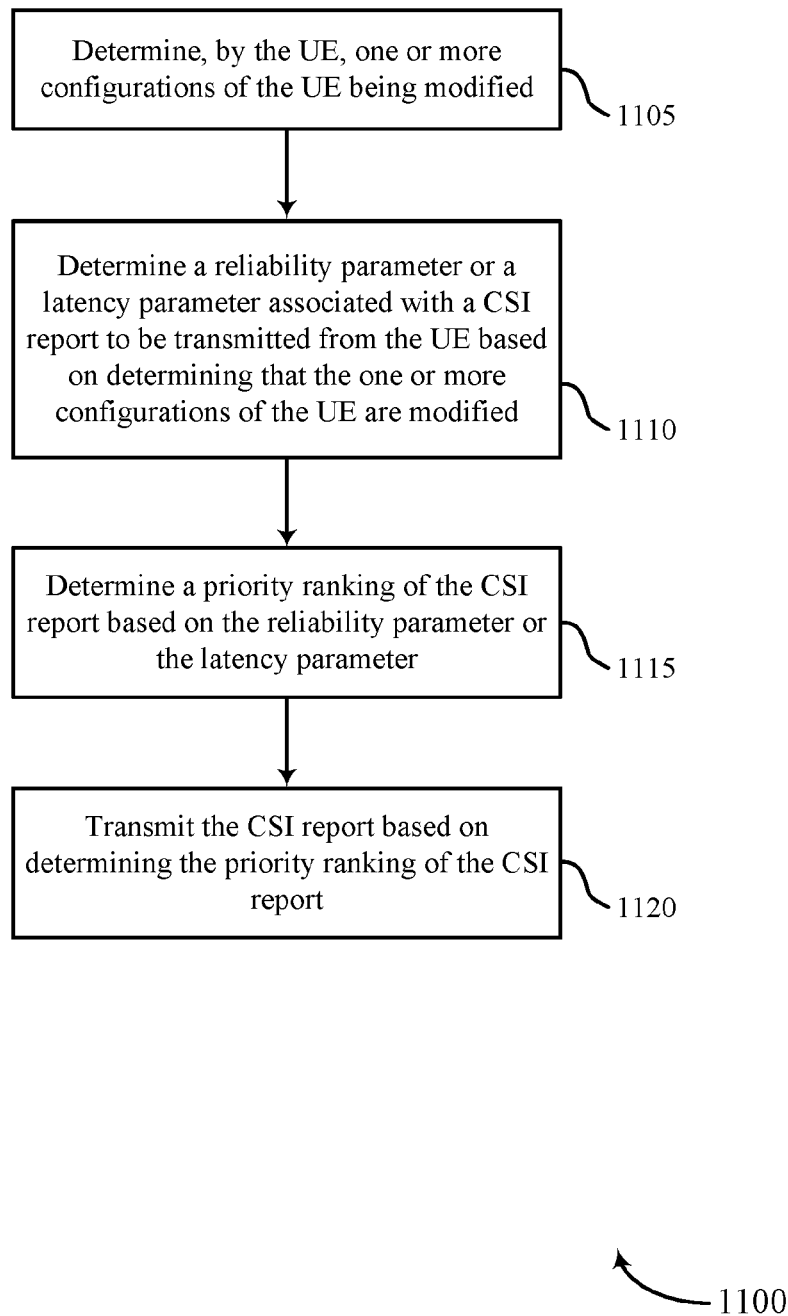

FIG. 11 shows a flowchart illustrating a method 1100 that supports techniques for prioritizing CSI reports in accordance with aspects of the present disclosure. The operations of method 1100 may be implemented by a UE 115 or its components as described herein. For example, the operations of method 1100 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1105, the UE may determine, by the UE, one or more configurations of the UE being modified. The operations of 1105 may be performed according to the methods described herein. In some examples, aspects of the operations of 1105 may be performed by a configuration manager as described with reference to FIGS. 4 through 7.

At 1110, the UE may determine a reliability parameter or a latency parameter associated with a CSI report to be transmitted from the UE based on determining that the one or more configurations of the UE are modified. The operations of 1110 may be performed according to the methods described herein. In some examples, aspects of the operations of 1110 may be performed by a parameter manager as described with reference to FIGS. 4 through 7.

At 1115, the UE may determine a priority ranking of the CSI report based on the reliability parameter or the latency parameter. The operations of 1115 may be performed according to the methods described herein. In some examples, aspects of the operations of 1115 may be performed by a priority manager as described with reference to FIGS. 4 through 7.

At 1120, the UE may transmit the CSI report based on determining the priority ranking of the CSI report. The operations of 1120 may be performed according to the methods described herein. In some examples, aspects of the operations of 1120 may be performed by a CSI report manager as described with reference to FIGS. 4 through 7.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for providing an understanding of the described techniques. These techniques, however, may be practiced without these specific details. In some instances, well-known structures and devices are shown in block diagram form to avoid obscuring the concepts of the described examples.

The description herein is provided to enable a person skilled in the art to make or use the disclosure. Various modifications to the disclosure will be clear to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication from a user equipment (UE), comprising:
   receiving downlink control information that includes a reliability parameter or a latency parameter associated with a channel state information (CSI) report to be transmitted from the UE, or both, wherein the reliability parameter or the latency parameter explicitly signaled in the downlink control information comprises one or more bits defining a priority of the CSI report;
   determining the reliability parameter or the latency parameter associated with the CSI report to be transmitted from the UE based at least in part on receiving the downlink control information;
   determining a priority ranking of the CSI report based at least in part on the reliability parameter or the latency parameter explicitly signaled in the downlink control information and comprising the one or more bits defining the priority of the CSI report; and
   transmitting the CSI report based at least in part on determining the priority ranking of the CSI report.

2. The method of claim 1, wherein:
   determining the priority ranking of the CSI report is based at least in part on the reliability parameter and the latency parameter.

3. The method of claim 1, further comprising:
   generating a combined parameter using the reliability parameter and the latency parameter, wherein determining the priority ranking of the CSI report is based at least in part on the combined parameter.

4. The method of claim 3, further comprising:
   identifying content in uplink control information, wherein generating the combined parameter is based at least in part on the content of the uplink control information.

5. The method of claim 1, further comprising:
   receiving a message that indicates the reliability parameter or the latency parameter or both, wherein determining the reliability parameter or the latency parameter is based at least in part on receiving the message.

6. The method of claim 1, further comprising:
   receiving a radio resource control (RRC) message, wherein determining the reliability parameter or the latency parameter is based at least in part on receiving the RRC message.

7. The method of claim 1, further comprising:
   determining a quality of service (QoS) parameter of resources associated with the CSI report, wherein determining the reliability parameter or the latency parameter is based at least in part on determining the QoS parameter.

8. The method of claim 1, further comprising:
   determining that resources associated with the CSI report are allocated for an enhanced mobile broadband (eMBB) service or an ultra reliable low latency communication (URLLC) service, wherein determining the reliability parameter or the latency parameter is based at least in part on the resources being allocated for the eMBB service or the URLLC service.

9. The method of claim 1, further comprising:
   determining, by the UE, one or more configurations of the UE being modified, wherein determining the reliability parameter or the latency parameter is based on determining that the one or more configurations of the UE are modified.

10. The method of claim 1, further comprising:
    determining that a new modulation and coding scheme (MCS) table different from an initial MCS table is configured for the UE, wherein determining the reliability parameter or the latency parameter is based at least in part on determining that the new MCS table is configured for the UE.

11. The method of claim 10, further comprising:
    determining whether a common search space or a UE-specific search space is used to receive downlink control information based at least in part on determining the new MCS table, wherein determining the reliability parameter or the latency parameter is based at least in part on determining whether the common search space or the UE-specific search space is used to receive the downlink control information.

12. The method of claim 1, further comprising:
    identifying that a new radio network temporary identifier (RNTI) different from an initial RNTI is configured for the UE; and
    determining whether a cyclic redundancy check (CRC) of downlink control information is scrambled using the new RNTI, wherein determining the reliability parameter or the latency parameter is based at least in part on determining that the CRC of the downlink control information is scrambled using the new RNTI.

13. The method of claim 1, further comprising:
    determining a CSI reference signal (CSI-RS) configuration for the UE, wherein determining the reliability parameter or the latency parameter is based at least in part on determining a CSI-RS configuration for the UE.

14. The method of claim 13, wherein the CSI-RS configuration includes information associated with a density of CSI-RSs, one or more ports used to communicate CSI-RSs, or a periodicity of CSI-RSs, or a combination thereof.

15. The method of claim 1, further comprising:
    determining a slot set identifier, wherein determining the priority ranking is based at least in part on the slot set identifier.

16. The method of claim 15, further comprising:
weighting the slot set identifier using a first factor that is different than a second factor used to weight the reliability parameter or the latency parameter, wherein determining the priority ranking of the CSI report is based at least in part on weighting the slot set identifier.

17. The method of claim 15, wherein the slot set identifier indicates whether the CSI report is associated with an uplink communication or a downlink communication.

18. The method of claim 1, further comprising:
weighting the reliability parameter or the latency parameter using a factor associated with a number of CSI reports, wherein determining the priority ranking is based at least in part on weighting the reliability parameter or the latency parameter.

19. The method of claim 18, wherein the factor includes a multiplier, a number of component carriers of resources associated with the UE, or a second number of CSI reports associated with each component carrier, or a combination thereof.

20. The method of claim 1, wherein:
determining the priority ranking of the CSI report is based at least in part on the reliability parameter, the latency parameter, a CSI type, a CSI content, a component carrier (CC) index, a CSI report identifier, or a slot set identifier, or a combination thereof.

21. An apparatus for wireless communication, comprising:
a processor,
memory in electronic communication with the processor; and
instructions stored in the memory and executable by the processor to cause the apparatus to:
receive downlink control information that includes a reliability parameter or a latency parameter associated with a channel state information (CSI) report to be transmitted from a user equipment (UE), or both, wherein the reliability parameter or the latency parameter explicitly signaled in the downlink control information comprises one or more bits defining a priority of the CSI report;
determine the reliability parameter or the latency parameter associated with the CSI report to be transmitted from the UE based at least in part on receiving the downlink control information;
determine a priority ranking of the CSI report based at least in part on the reliability parameter or the latency parameter explicitly signaled in the downlink control information and comprising the one or more bits defining the priority of the CSI report; and
transmit the CSI report based at least in part on determining the priority ranking of the CSI report.

22. The apparatus of claim 21, wherein determining the priority ranking of the CSI report is based at least in part on the reliability parameter and the latency parameter.

23. The apparatus of claim 21, wherein the instructions are further executable by the processor to cause the apparatus to:
generate a combined parameter using the reliability parameter and the latency parameter, wherein determining the priority ranking of the CSI report is based at least in part on the combined parameter.

24. The apparatus of claim 23, wherein the instructions are further executable by the processor to cause the apparatus to:
identify content in uplink control information, wherein generating the combined parameter is based at least in part on the content of the uplink control information.

25. The apparatus of claim 21, wherein the instructions are further executable by the processor to cause the apparatus to:
receive a message that indicates the reliability parameter or the latency parameter or both, wherein determining the reliability parameter or the latency parameter is based at least in part on receiving the message.

26. The apparatus of claim 21, wherein the instructions are further executable by the processor to cause the apparatus to:
determine that resources associated with the CSI report are allocated for an enhanced mobile broadband (eMBB) service or an ultra reliable low latency communication (URLLC) service, wherein determining the reliability parameter or the latency parameter is based at least in part on the resources being allocated for the eMBB service or the URLLC service.

27. An apparatus for wireless communication, comprising:
means for receiving downlink control information that includes a reliability parameter or a latency parameter associated with a channel state information (CSI) report to be transmitted from a user equipment (UE), or both, wherein the reliability parameter or the latency parameter explicitly signaled in the downlink control information comprises one or more bits defining a priority of the CSI report;
means for determining the reliability parameter or the latency parameter associated with the CSI report to be transmitted from the UE based at least in part on receiving the downlink control information;
means for determining a priority ranking of the CSI report based at least in part on the reliability parameter or the latency parameter explicitly signaled in the downlink control information and comprising the one or more bits defining the priority of the CSI report; and
means for transmitting the CSI report based at least in part on determining the priority ranking of the CSI report.

28. A non-transitory computer-readable medium storing code for wireless communication, the code comprising instructions executable by a processor to:
receive downlink control information that includes a reliability parameter or a latency parameter associated with a channel state information (CSI) report to be transmitted from a user equipment (UE), or both, wherein the reliability parameter or the latency parameter explicitly signaled in the downlink control information comprises one or more bits defining a priority of the CSI report;
determine the reliability parameter or the latency parameter associated with the CSI report to be transmitted from the UE based at least in part on receiving the downlink control information;

determine a priority ranking of the CSI report based at least in part on the reliability parameter or the latency parameter explicitly signaled in the downlink control information and comprising the one or more bits defining the priority of the CSI report; and transmit the CSI report based at least in part on determining the priority ranking of the CSI report.

* * * * *